United States Patent [19]

Wu

[11] Patent Number: 5,342,018

[45] Date of Patent: Aug. 30, 1994

[54] SINGLE-HANDLE FAUCET

[75] Inventor: Robin Wu, Hsinchu Hsien, Taiwan

[73] Assignee: Advanced Cardiovascular Systems, Inc., Santa Clara, Calif.

[21] Appl. No.: 63,257

[22] Filed: May 18, 1993

[51] Int. Cl.$^5$ ............................................. F16K 31/54
[52] U.S. Cl. ........................................ 251/250; 251/318
[58] Field of Search ............. 137/625.17, 363.2, 636.3, 137/636.4, 625.4; 251/250, 250.5, 318, 319, 324

[56] References Cited

U.S. PATENT DOCUMENTS

| 188,577 | 3/1877 | Bradley | 251/250.5 |
|---|---|---|---|
| 401,588 | 4/1889 | Ray | 251/250 |
| 960,695 | 6/1910 | Petro | 251/250 X |
| 1,573,210 | 2/1926 | Whidden | 137/636.2 |
| 2,049,663 | 8/1936 | Rice | 251/250 X |
| 2,058,631 | 10/1936 | Rice | 251/250 X |
| 2,331,527 | 10/1943 | Welty et al. | 251/250 X |
| 2,589,857 | 3/1952 | Pena | 137/636.3 |
| 2,679,865 | 6/1954 | Griffith | 137/636.4 X |
| 2,753,891 | 7/1956 | Parker | 137/636.3 X |
| 2,841,178 | 7/1958 | Schultz | 251/250 X |

Primary Examiner—John Rivell
Attorney, Agent, or Firm—Fulwider, Patton Lee & Utecht

[57] ABSTRACT

A single-handle faucet includes a faucet body which has an open top and which is formed with a spout, an upright water pipe provided inside the faucet body, and a cartridge stem extending slidably into the upright water pipe and being movable between a first position, in which water flow from the water pipe to the spout is permitted, and a second position, in which water flow from the water pipe to the spout is not permitted. A cover unit is mounted on the open top of the faucet body and has an apex that is formed with a curved slit. A driving piece has a pair of opposite pivot arms which extend downwardly through the curved slit and which have lower ends pivoted to the cover unit, and a curved extension which extends downwardly through the curved slit and which is in sliding contact with an inner wall surface of the cover unit. The curved extension is formed with a toothed inner surface. A driven piece is connected to a topmost end of the cartridge stem and has a rack formed thereon. A pinion is mounted rotatably within the cover unit and interengages the rack and the toothed inner surface. A lever has one end extending above the apex of the cover unit and is connected to the driving piece.

4 Claims, 5 Drawing Sheets

SINGLE-HANDLE FAUCET

BACKGROUND OF THE INVENTION

1. Field of the Invention

The invention relates to as single-handle faucet, more particularly to a single-handle faucet with improved water flow control.

2. Description of the Related Art

FIG. 1 is an illustration of a conventional single-handle faucet. The faucet includes a hollow faucet body (14') which is formed with a spout (16'), an upright water pipe (1') which is provided inside the faucet body (16'), and a cartridge stem (11') which extends slidably into the water pipe (1'). The cartridge stem (11') is movable between a first position, wherein water flow from the water pipe (1') to the spout (16') is permitted, and a second position, wherein water flow from the water pipe (1') to the spout (16') is not permitted. A bent lever (12') has one end connected to a top end of the cartridge stem (11'). The other end (121') of the bent lever (12') extends out of the faucet body (14'). The bent lever (12') has an intermediate bent portion which is connected pivotally to the faucet body (14') by means of a pivot unit (13') on one side of the faucet body (14'). The other end (121') of the bent lever (12') is pivoted upwardly or downwardly so as to move the cartridge stem (11') vertically between the first and second positions within the upright water pipe (1') in order to adjust the amount of water flow through the spout (16').

Referring to FIGS. 1 and 2, when the other end (121') of the bent lever (12') is operated, the pivot unit (13') is shifted slightly from a first position to a second position (131') in order to permit vertical movement of the cartridge stem (11'). The shifting movement of the pivot unit (13') prevents smooth operation of the bent lever (12').

In addition, the bent lever (12') applies a horizontal force on the cartridge stem (11') when the bent lever (12') is operated. Unstable movement of the cartridge stem (11') thus occurs, thereby resulting in deformation of a sealing ring (15') around the cartridge stem (11') and in the generation of a large resistance to movement of the cartridge stem (11'). Thus, the useful life of the conventional single-handle faucet is relatively short.

SUMMARY OF THE INVENTION

Therefore, the objective of the present invention is to provide a single-handle faucet with improved water flow control which can overcome the above-mentioned drawbacks that are commonly associated with the prior art.

Accordingly, a single-handle faucet of the present invention comprises:

a hollow faucet body which has an open top and which is formed with a spout;

an upright water pipe provided inside the faucet body;

a cartridge stem extending slidably into the upright water pipe and being movable between a first position, in which water flow from the water pipe to the spout is permitted, and a second position, in which water flow from the water pipe to the spout is not permitted;

a substantially dome-shaped cover unit which is mounted on the open top of the faucet body and which has an apex that is formed with a curved slit;

a driving piece having a pair of opposite pivot arms which extend downwardly through the cover unit via the curved slit and which have lower ends pivoted to the cover unit, the driving piece further having a curved extension which extends downwardly through the cover unit via the curved slit and which is in sliding contact with an inner wall surface of the cover unit, the curved extension being formed with a toothed inner surface;

a driven piece which is connected to a topmost end of the cartridge stem and which has a rack formed on one side of the cartridge stem;

a pinion which is mounted rotatably within the cover unit and which interengages the rack of the driven piece and the toothed inner surface of the curved extension; and a lever having one end extending above the apex of the cover unit, the driving piece being connected to the one end of the lever, the lever being operable so as to move the curved extension along the curved slit in order to move the cartridge stem between the first and second positions.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
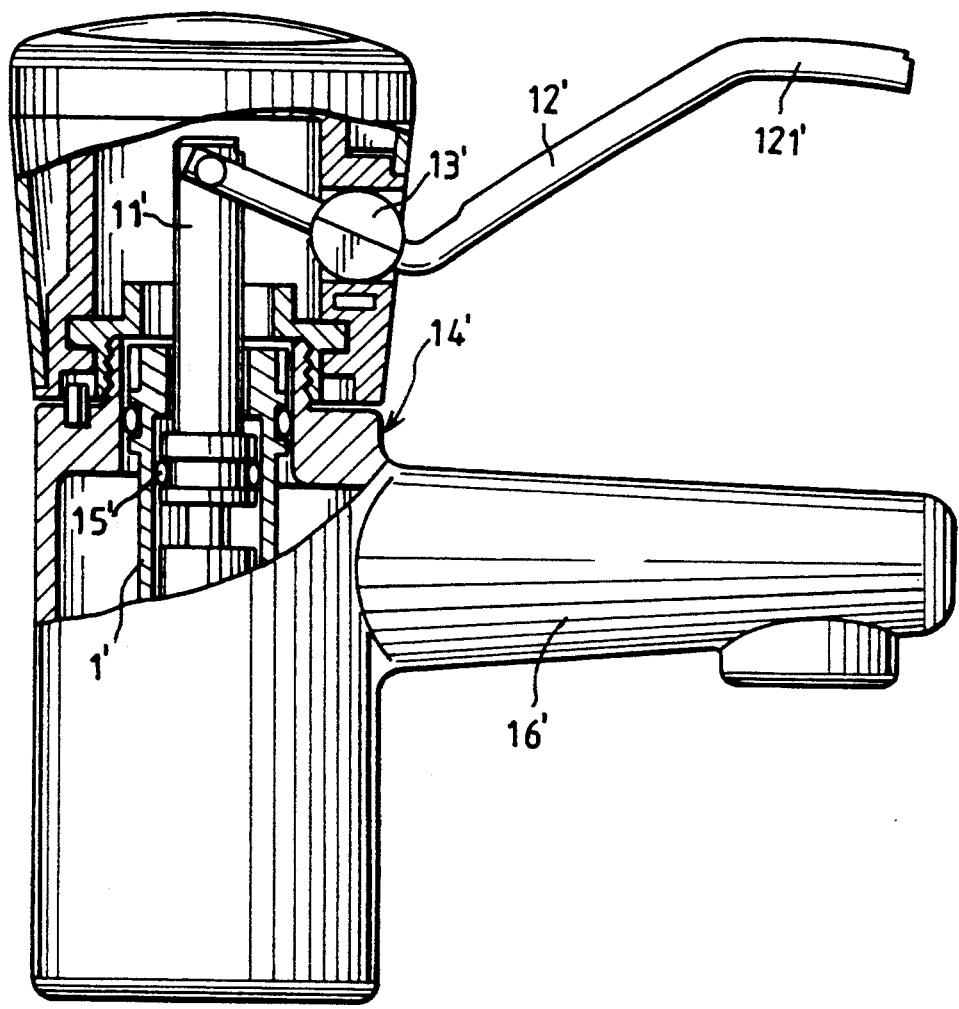
FIG. 1 is an illustration of a conventional single-handle faucet.
Figure 2:
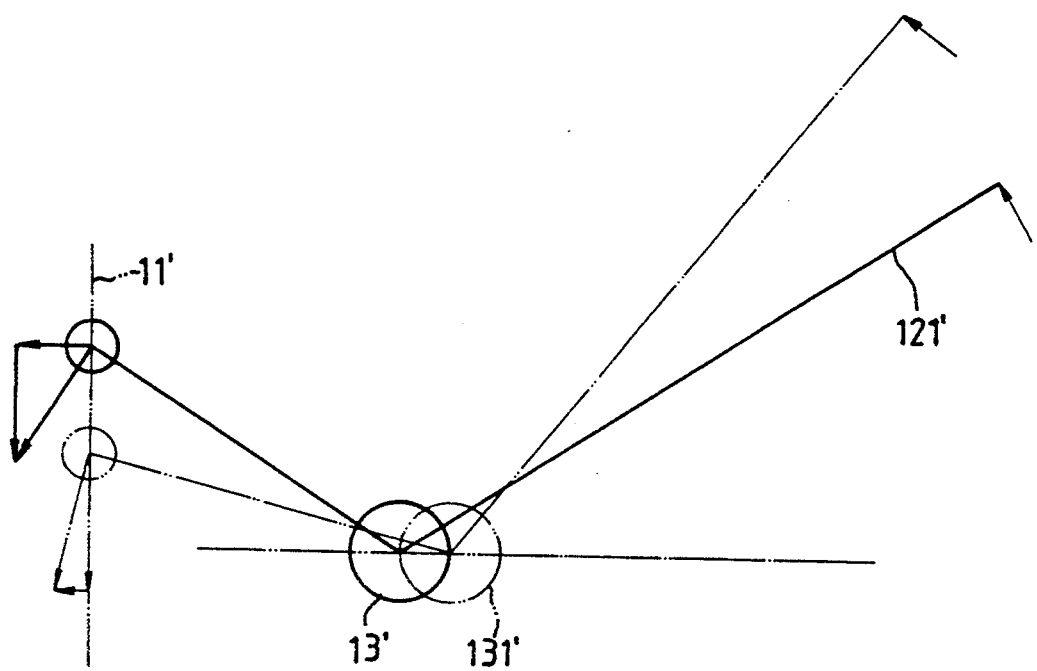
FIG. 2 is a force diagram of the resulting forces in the conventional single-handle faucet when the faucet is operated.
Figure 3:
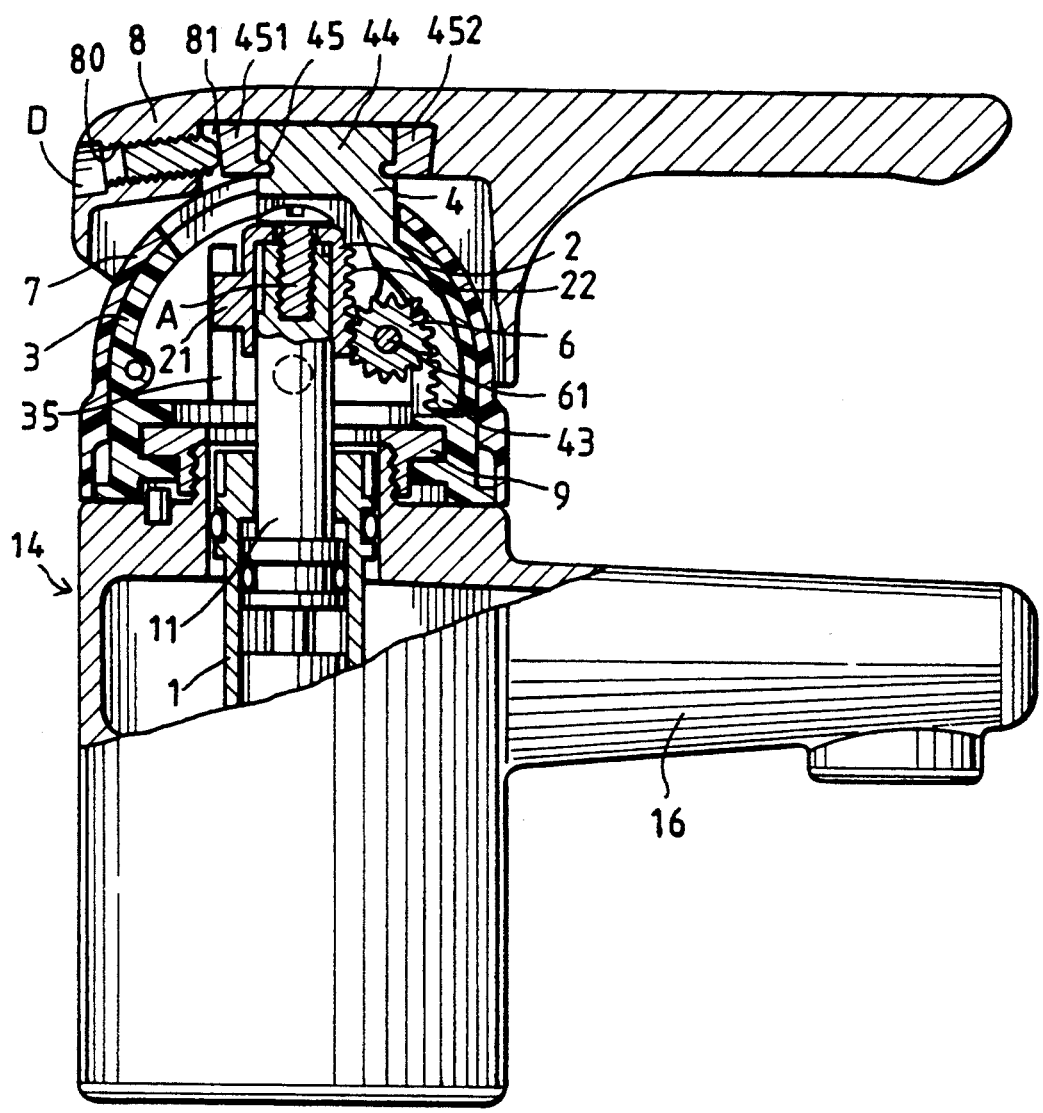
FIG. 3 is a partial sectional view of the preferred embodiment of a single-handle faucet according to the present invention to illustrate the faucet when in a closed state.
Figure 4:
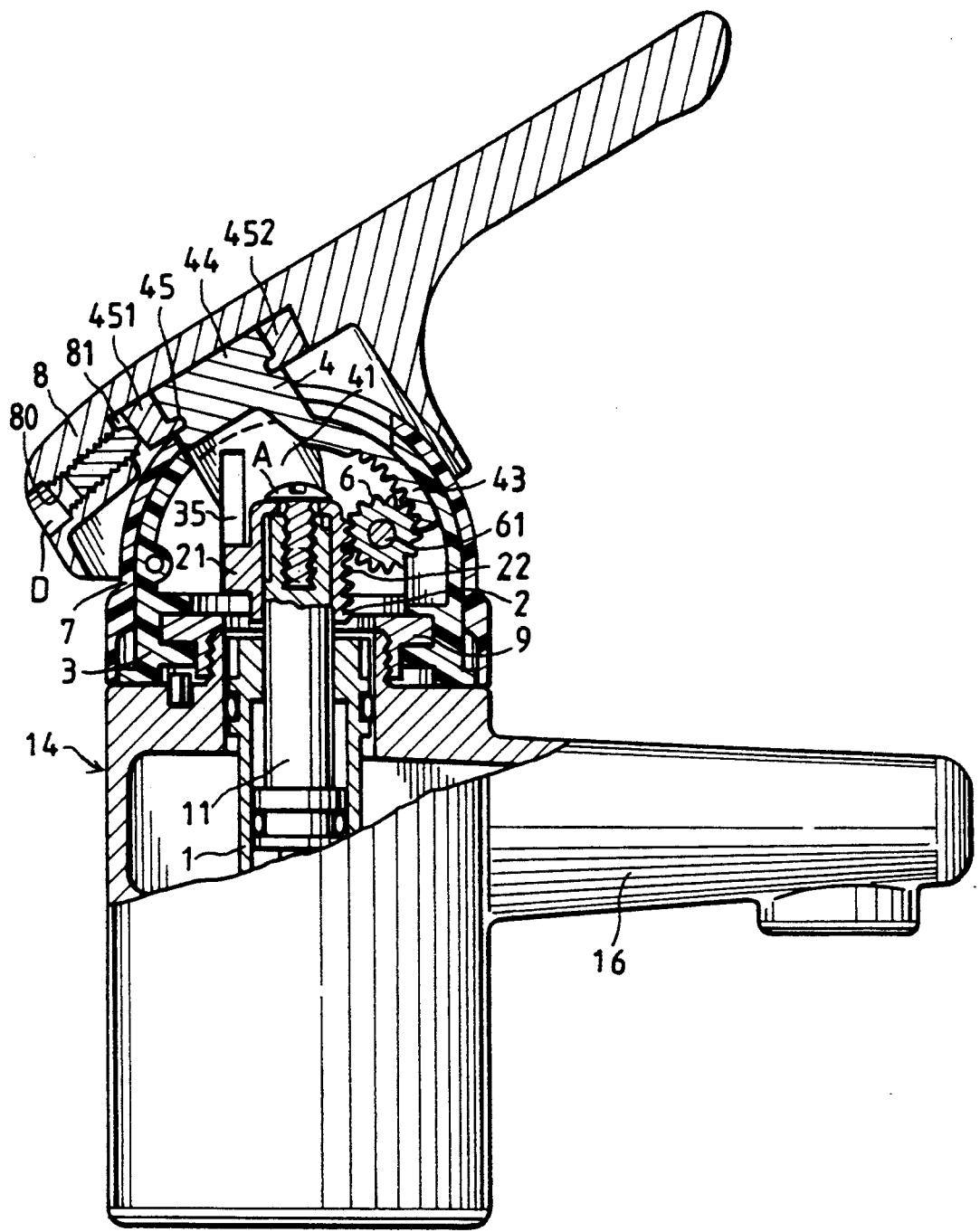
FIG. 4 is a partial sectional view of the preferred embodiment to illustrate the faucet when in an open state.
Figure 5:
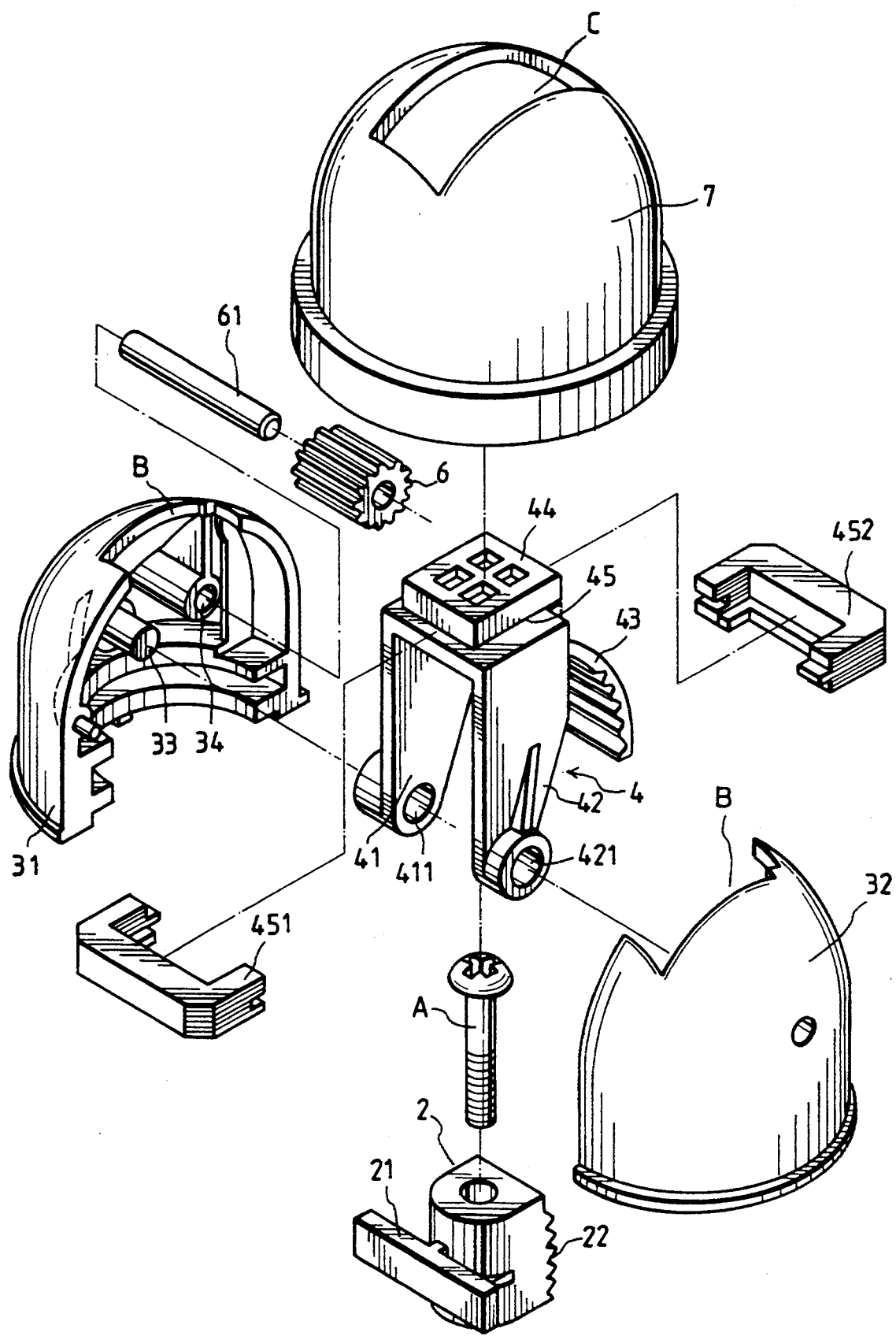
FIG. 5 is a fragmentary perspective view of the preferred embodiment.

Referring to FIGS. 3 to 5, the preferred embodiment of a single-handle faucet according to the present invention is shown to comprise a hollow faucet body (14), an upright water pipe (1), a cartridge stem (11), a cover unit (7), a driving piece (4), a driven piece (2), a pinion (6) and a lever (8).

The faucet body (14) is formed with a spout (16) and has an open top. The water pipe (1) is provided inside the faucet body (14). The cartridge stem (11) extends slidably into the upright water pipe (1) and is movable between a first position, in which water flow from the water pipe (1) to the spout (16) is permitted, and a second position, in which water flow from the water pipe (1) to the spout (16) is not permitted. The cover unit (7) is substantially dome-shaped and is mounted on the open top of the faucet body (14). The cover unit (7) has an apex that is formed with a curved slit (C). The cover unit (7) is provided with a lining (3) which includes left and right curved lining parts (31, 32). A fastening piece (9) is provided to secure the lining (3) on the faucet body (14). The top ends of the curved lining parts (31, 32) are respectively formed with a notch (B) that confine cooperatively an opening which registers with the curved slit (C) of the cover unit (7). The lining parts (31, 32) are respectively formed with aligned inwardly projecting pivot pins (33) and tubular shaft supports (34). The driving piece (4) has a flat top end (44) that is formed as a rectangular block and that is provided with a peripheral groove (45), and a pair of opposite pivot arms (41, 42) that extend downwardly through the cover unit (7) and the lining (3) via the curved slit (C) and the notches (B) and that have lower ends which are respectively formed with aligned pivot holes (411, 421). The pivot pins (33) extend respectively through the pivot holes (411, 421) so as to mount pivotally the driving piece (43) to the cover unit (3). The driving piece (4) further has a curved extension (43) which extends downwardly through the cover unit (7) and the lining (3) via the curved slit (C) and the notches (B) and which is in sliding contact with an inner surface of the lining (3). The curved extension (43) is formed with a toothed inner surface. The pivot arms (41, 42) and the curved extension (43) confine a hollow space thereamong. The driven piece (2) is connected to a topmost end of the cartridge stem (11) by means of a screw (A) and extends into the hollow space. The driven piece (2) has one side which is formed with a rack (22) and an opposite side that is formed with a horizontal guide projection (21). A shaft (61) extends through the pinion (6) and has two ends that engage a respective one of the tubular shaft supports (34), thereby mounting the pinion (6) rotatably within the cover unit (3). The pinion (6) interengages the rack (22) of the driven piece (2) and the toothed inner surface of the curved extension (43). Each of the lining parts (31, 32) is formed with a vertical guide groove (35) that receives a respective end of the guide projection (21) therein so as to guide vertical movement of the cartridge stem (11) within the upright water pipe (1). One end of the lever (8) extends above the apex of the cover unit (8) and has a rear surface which is formed with a recess (81) to receive the top end (44) of the driving piece (4) therein. The lever (8) further has a threaded radial bore (80) that extends from an exterior thereof to the recess (81). A pair of matching positioning pieces (451, 452) are provided in the recess (81) around the top end (44) of the driving piece (4) and engage the peripheral groove (45) of the driving piece (4). A threaded shank (D) extends threadably into the radial bore (80) so as to push the positioning pieces (451, 452) tightly against the driving piece (4), thereby connecting the driving piece (4) to the lever (8).

Referring once more to FIG. 4, when the lever (8) is pivoted upward relative to the faucet body (14), the curved extension (43) moves along the curved slit (C), thereby causing the pinion (6) to rotate in order to move therewith the rack (22) of the driven piece (2) downward. Downward movement of the driven piece (2) results in corresponding downward movement of the cartridge stem (11), thereby moving the cartridge stem (11) to the first position in which water flow from the water pipe (1) to the spout (16) is permitted. Accordingly, when the lever (8) is pivoted downward, the pinion (6) rotates in the opposite direction, thereby moving the driven piece (2) and the cartridge stem (11) upward back to the second position in which water flow from the water pipe (1) to the spout (16) is not permitted, as shown in FIG. 3.

It has thus been shown that smooth operation of the lever (8) and stable movement of the cartridge stem (11) are attainable in the present invention. The objective of the present invention is thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A single-handle faucet including a hollow faucet body which is formed with a spout, an upright water pipe provided inside said faucet body, and a cartridge stem extending slidably into said upright water pipe and being movable between a first position, in which water flow from said water pipe to said spout is permitted, and a second position, in which water flow from said water pipe to said spout is not permitted, wherein the improvement comprises:

said faucet body having an open top and said single-handle faucet including: a substantially dome-shaped cover unit which is mounted on said open top of said faucet body and which has an apex that is formed with a curved slit; a driving piece having a pair of opposite pivot arms which extend downwardly through said cover unit via said curved slit and which have lower ends pivoted to said cover unit, said driving piece further having a curved extension which extends downwardly through said cover unit via said curved slit and which is in sliding contact with an inner wall surface of said cover unit, said curved extension being formed with a toothed inner surface; a driven piece which is connected to a topmost end of said cartridge stem and which has a rack formed on one side of said cartridge stem; a pinion mounted rotatably within said cover unit and interengaging said rack of said driven piece and said toothed inner surface of said curved extension; and a lever having one end extending above said apex of said cover unit, said driving piece being connected to said one end of said lever, said lever being operable so as to move said curved extension along said curved slit in order to move said cartridge stem between said first and second positions.

2. The single-handle faucet as claimed in claim 1, wherein said lower ends of said pivot arms of said driving piece are formed with aligned pivot holes, said cover unit being formed with an aligned pair of inwardly projecting pivot pins that extend respectively into said pivot holes, said pivot arms and said curved extension confining a hollow space thereamong, said driven piece extending into said hollow space.

3. The single-handle faucet as claimed in claim 1, wherein said driven piece is formed with a horizontal guide projection, said cover unit being formed with a vertical guide groove that receives one end of said guide projection therein so as to guide vertical movement of said cartridge stem within said upright water pipe.

4. The single-handle faucet as claimed in claim 1, wherein said driving piece has a top end which is formed with a peripheral groove, said one end of said lever having a rear surface which is formed with a recess to receive said top end of said driving piece therein, said lever further having a threaded radial bore extending from an exterior of said lever to said recess, a pair of matching positioning pieces which are provided in said recess around said top end of said driving piece and which engage said peripheral groove of said driving piece, and a threaded shank extending threadably into said radial bore so as to push said positioning pieces tightly against said driving piece.

* * * * *

UNITED STATES PATENT AND TRADEMARK OFFICE
CERTIFICATE OF CORRECTION

PATENT NO. : 5,342,018
DATED : August 30, 1994
INVENTOR(S) : Robin Wu

It is certified that error appears in the above-indentified patent and that said Letters Patent is hereby corrected as shown below:

Change the name of the Assignee FROM Advanced Cardiovascular Systems, Inc. TO HCG-MOEN CORP. Taipei, Taiwan Signed and Sealed this Twenty-first Day of March, 1995

Attest:

BRUCE LEHMAN

Attesting Officer     Commissioner of Patents and Trademarks